C. R. Clark,

Sleigh Bells,

N° 70,526. Patented Nov. 5, 1867.

Witnesses;
Theo Tusche
W.m Trewin

Inventor;
C. R. Clark
Per Munn & Co
Attorneys

United States Patent Office.

CYRUS R. CLARK, OF COBALT, CONNECTICUT.

Letters Patent No. 70,526, dated November 5, 1867.

IMPROVEMENT IN SLEIGH-BELLS.

*The Schedule referred to in these Letters Patent and making part of the same.*

TO ALL WHOM IT MAY CONCERN:

Be it known that I, CYRUS R. CLARK, of Cobalt, in the county of Middlesex, and State of Connecticut, have invented a new and useful Improvement in Sleigh-Bells; and I do hereby declare that the following is a full, clear, and exact description thereof, which will enable others skilled in the art to make and use the same, reference being had to the accompanying drawings, forming part of this specification, in which—

This invention relates to a sleigh-bell, to which a shank is cast in the usual manner. To each side of the shank are secured, by means of rivets or otherwise, sheet-metal plates which project beyond the lower end of the shank, forming flanges. When inserted in a leather strap, the flanges project beyond the inside of the same, and are then bent out, so as to firmly lock the bell to the strap.

Figure 1:
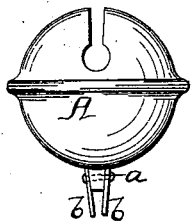
Figure 1 is a side view of my improved sleigh-bell.
Figure 2:
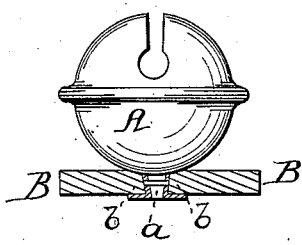
Figure 2 is a side view of the same, partly in section, showing how it is attached to and held on the strap. Similar letters of reference indicate like parts.

A represents a sleigh-bell, to which the shank $a$ is cast. To the sides of the shank are soldered, riveted, or otherwise secured, two sheet-metal plates, $b\ b$, which project beyond the end of the shank, as is shown in fig. 1. The shank and plates can be easily passed through a hole in the leather strap B, and the ends of the projecting plates are then bent out so as to clamp the leather between their ends and the body of the bell, as is shown in fig. 2. When thus bent, the ends of the plates and the end of the shank will not project at the inside of the leather strap sufficient to require an inner lining, or to destroy the same when used. The rectangular form of the shank prevents the bell from turning. The rivet or other device by which the plates $b$ are fastened to the shank cannot break or fall off, as it is held in the leather. The shank, when cast with the bell, is far superior to the rivets which are frequently employed; the heads of the rivets in the bells being not only soon worn off by the jinglet or tongue, but the introduction of another piece of metal destroys the clearness of the sound.

I want to be distinctly understood that I do not claim the shank $a$, nor the manner of securing the same to or casting it with the bell; but what I do claim as new, and desire to secure by Letters Patent, is—

Attaching sleigh-bells to their straps by means of two or more sheet-metal plates, $b\ b$, which are secured to a shank, $a$, that is cast with the bell A, all made substantially as and for the purpose herein shown and described.

CYRUS R. CLARK.

Witnesses:
    DANL. S. TIBBALS,
    R. E. TIBBALS.